Patented Jan. 1, 1924.

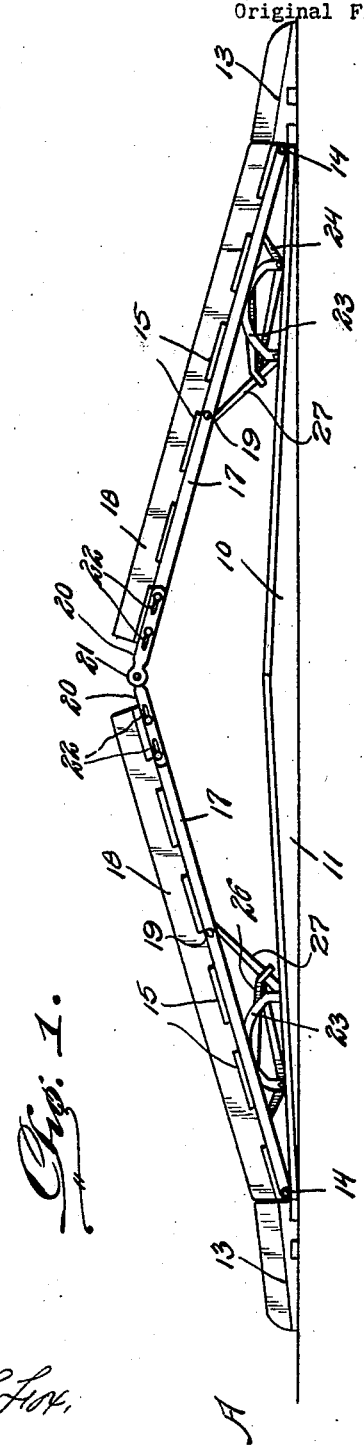
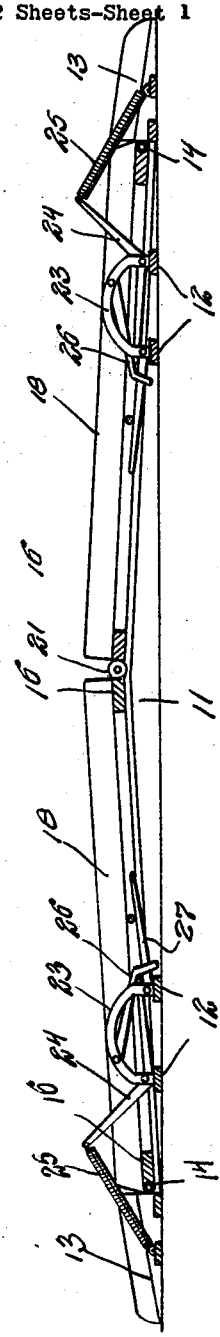

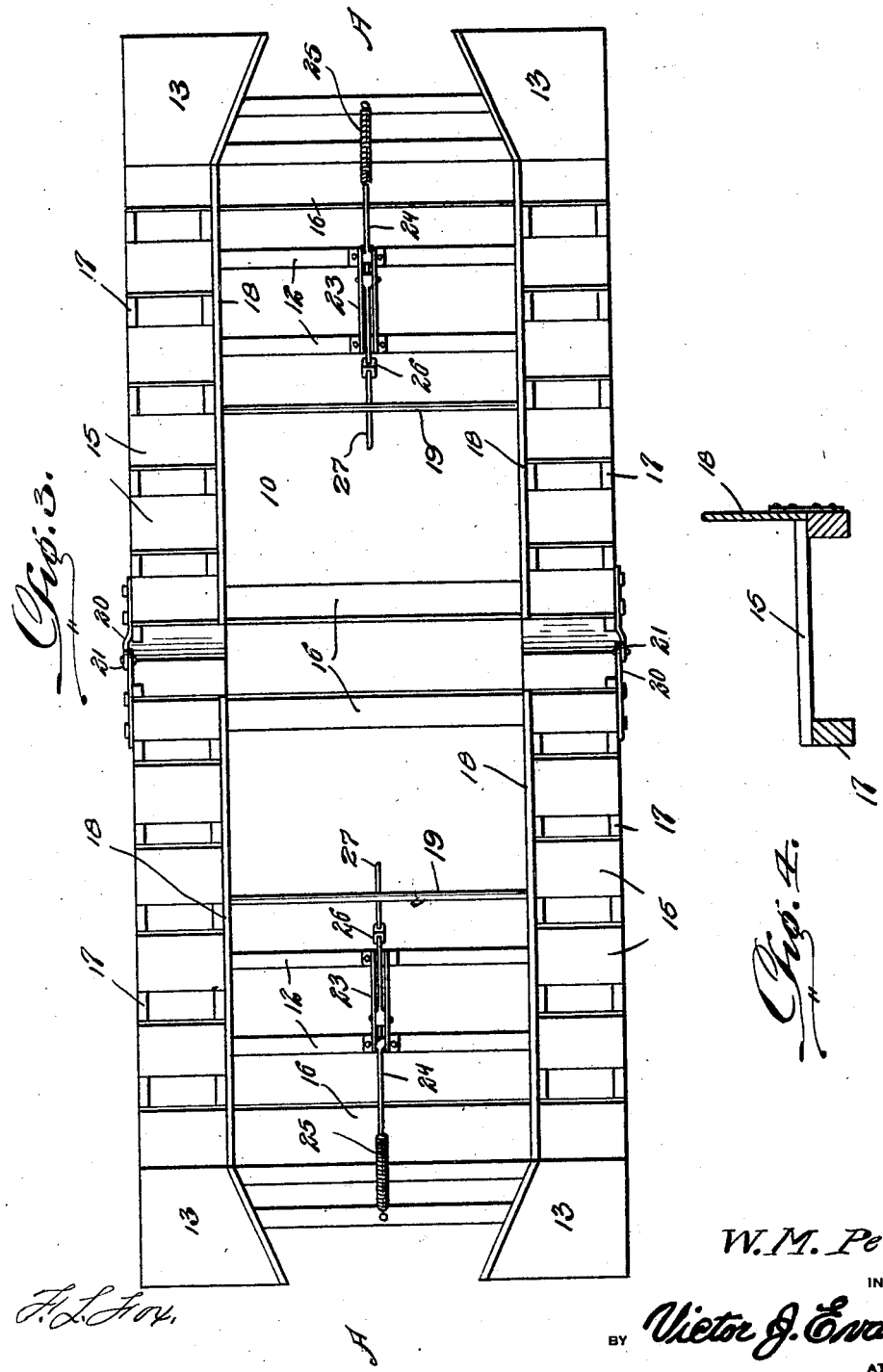

1,479,736

UNITED STATES PATENT OFFICE.

WILLIAM M. PETTY, OF LIVERMORE, COLORADO, ASSIGNOR OF ONE-HALF TO GEORGE R. HOLCOMB, OF LARAMIE, WYOMING.

GUARD.

Application filed July 23, 1921, Serial No. 487,079. Renewed June 1, 1923.

*To all whom it may concern:*

Be it known that I, WILLIAM M. PETTY, a citizen of the United States, residing at Livermore, in the county of Alameda and State of Colorado, have invented new and useful Improvements in Guards, of which the following is a specification.

This invention relates to gate devices and has for its object the provision of a gate structure designed to be used at roadways, at the gate to pastures, and at other places whereby to prevent the passage of cattle, sheep, or other live stock, the gate being so constructed that an automobile driven onto the approach thereof will cause the sections of the gate to be depressed so that the automobile may pass over, spring means being provided for retaining the gate sections in their normal obstructing position.

An important object is the provision of a device of this character in which the action is entirely automatic, the parts being moved in one direction by the weight of the vehicle and in the other direction by the action of the springs.

An additional object is the provision of a device of this character which will be simple and inexpensive in manufacture and installation, highly efficient in use, not likely to get out of order, durable in service and a general improvement in the art.

With the above and other objects and advantages in view, the invention consists in the details of construction to be hereinafter more fully described and claimed and illustrated in the accompanying drawings in which, Figure 1 is a side elevation of my device in normal position, Figure 2 is a longitudinal sectional view therethrough showing the gate sections in lowered position, Figure 3 is a plan view with the parts arranged as in Figure 1.

Figure 4 is a cross sectional view.

Referring more particularly to the drawings, the letter A designates the approach to a gateway or the like. In carrying out my invention, I provide a frame 10 of rectangular shape formed of suitable planking including longitudinal members 11 and cross members 12. This frame is laid flat upon the ground and may be anchored by any desired means such as stakes, not shown. At the ends of the frame 10 are provided approach members 13 formed as relatively small platforms.

Hinged, as shown at 14, upon each end of the frame is a gate section including a pair of tread members 15 connected by suitable cross bars 16. The tread members 15 of the gate are supported by longitudinal bars 17 which are connected at their inner ends by transverse bars 16. Vertical guide members 18 are provided for the treads. Intermediate the ends of the bars 17 are mounted transverse rods 19.

In order that the gate members may be connected for simultaneous movement, I provide a pair of strips 20 secured upon the free edge of each gate section and the corresponding ends of these members 20 are pivotally connected by knuckles 21. The members 20 are provided with slots 22 through which pass bolts passing into the gate sections and it will be seen that this particular connection permits the gate sections to be folded down flat on the frame 10 while permitting the gate sections also to swing upwardly into obstructing position.

In order to provide means for holding the gates normally in their upwardly extending or obstructing position, I make use of semi-circular upstanding guides 23 secured to the cross bars 12. Pivotally mounted upon one of the transverse bars 12 of the main frame, at one end of each guide 23, is an angle lever 24 which has its other end connected with the frame. The other end of this angle lever engages an angular end portion 26 of an intermediate lever which in turn engages beneath a lever 27 pivoted at the other end of each guide. These levers 27 engage beneath the cross-bars 19 of the gate sections and it will therefore be seen that the springs operate to hold the gate sections normally in upwardly extending position so as to prevent passage of cattle, sheep, or other live stock.

In the operation of the device it will be seen that when a vehicle approaches the device and is driven onto the approach platform 13 the wheels of the vehicle will engage the members 15 and press them downwardly so that the vehicle may be driven over the device. The members 18, as before mentioned, will operate to prevent the wheels from slipping off the device. Owing to the provision of the members 20 it will be seen that when one gate section is pressed down the other will also be pressed down. After the vehicle has passed over the spring-pressed lever mechanism described will return the gate sections to their normal upwardly extending positions.

In Figures 5 and 6 I have shown a somewhat modified form of the device. In some respects this form may be considered simpler than the above described form so it will be observed that the general construction is substantially the same and that the parts function in practically the same manner so that this form of the device will operate fully as effectively as the first described form.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A device of the character described comprising a supporting frame provided at its ends with approach members, a pair of gate sections hinged at their outer ends upon the frame, links pivotally connected with each other and slidably connected with the adjacent ends of the gate sections to permit simultaneous movement of the gate sections, a pair of spaced parallel brackets located beneath each gate section, an angle lever pivoted between said pair of brackets, a coil spring connected with one arm of the angle lever and connected with one of the approach members, a member pivoted between the brackets and extending inwardly toward the meeting ends of the gate, a transverse member carried by the gate section and engaging said last named member, an intermediate angularly shaped element pivoted between the guides and engaging said inwardly extending member, said intermediate element being engaged by the free arm of said angle lever.

In testimony whereof I affix my signature.

WILLIAM M. PETTY.